(12) United States Patent
Restuccia et al.

(10) Patent No.: US 11,610,111 B2
(45) Date of Patent: Mar. 21, 2023

(54) REAL-TIME COGNITIVE WIRELESS NETWORKING THROUGH DEEP LEARNING IN TRANSMISSION AND RECEPTION COMMUNICATION PATHS

(71) Applicant: Northeastern University, Boston, MA (US)

(72) Inventors: Francesco Restuccia, Boston, MA (US); Tommaso Melodia, Newton, MA (US)

(73) Assignee: Northeastern University, Boston, MA (US)

(*) Notice: Subject to any disclaimer, the term of this patent is extended or adjusted under 35 U.S.C. 154(b) by 695 days.

(21) Appl. No.: 16/591,772

(22) Filed: Oct. 3, 2019

(65) Prior Publication Data

US 2021/0357742 A1 Nov. 18, 2021

Related U.S. Application Data

(60) Provisional application No. 62/740,669, filed on Oct. 3, 2018.

(51) Int. Cl.
*G06N 3/08* (2006.01)
*G06N 3/063* (2006.01)
(Continued)

(52) U.S. Cl.
CPC .............. *G06N 3/08* (2013.01); *G06N 3/04* (2013.01); *G06N 3/063* (2013.01); *H04W 24/02* (2013.01)

(58) Field of Classification Search
None
See application file for complete search history.

(56) References Cited

U.S. PATENT DOCUMENTS 11,204,747 B1* 12/2021 Zejda ................... G06F 9/451
2005/0204286 A1* 9/2005 Buhrke ................. G10L 21/10
704/E21.02

(Continued)

OTHER PUBLICATIONS

Zhang et al. "A FPGA-Based, Granularity-Variable Neuromorphic Processor and Its Application in a MIMO Real-Time Control System", Published Aug. 23, 2017 (Year: 2017).*

(Continued)

*Primary Examiner* — Viet D Vu
*Assistant Examiner* — Mohammad Yousuf A. Mian
(74) *Attorney, Agent, or Firm* — Verrill Dana, LLP (57) ABSTRACT

Apparatuses and methods for real-time spectrum-driven embedded wireless networking through deep learning are provided. Radio frequency, optical, or acoustic communication apparatus include a programmable logic system having a front-end configuration core, a learning core, and a learning actuation core. The learning core includes a deep learning neural network that receives and processes input in-phase/quadrature (I/Q) input samples through the neural network layers to extract RF, optical, or acoustic spectrum information. A processing system having a learning controller module controls operations of the learning core and the learning actuation core. The processing system and the programmable logic system are operable to configure one or more communication and networking parameters for transmission via the transceiver in response to extracted spectrum information.

20 Claims, 6 Drawing Sheets

(51) Int. Cl.
    *G06N 3/04*     (2006.01)
    *H04W 24/02*     (2009.01)

(56) References Cited

U.S. PATENT DOCUMENTS

| | | | | |
|---|---|---|---|---|
| 2010/0128824 | A1* | 5/2010 | Hui | H04L 27/2671 375/344 |
| 2018/0129621 | A1* | 5/2018 | Lee | G06F 13/1673 |
| 2018/0253635 | A1* | 9/2018 | Park | G06F 7/535 |
| 2018/0324595 | A1* | 11/2018 | Shima | G06N 3/06 |
| 2019/0340010 | A1* | 11/2019 | Lee | G06F 9/5016 |
| 2021/0248087 | A1* | 8/2021 | Pan | G06F 5/06 |

OTHER PUBLICATIONS

Zhang et al., "Learning to Detect and Mitigate Cross-layer Attacks in Wireless Networks: Framework and Applications," in Proc. of IEEE Conf. on Communications and Network Security, Las Vegas, NV, USA, Oct. 2017; 9 pages.

LeCun et al., "Deep learning." Nature, vol. 521, No. 7553, p. 436-444, 2015.

Defense Advanced Research Projects Agency (DARPA), "The Radio Frequency Spectrum + Machine Learning = A New Wave in Radio Technology," www.darpa.mil/news-events/2017-08-11a, 2017; 4 pages.

Pawar et al., "Modulation Recognition in Continuous Phase Modulation Using Approximate Entropy." IEEE Transactions on Information Forensics and Security, vol. 6, No. 3, pp. 843-852, Sep. 2011.

Shi et al., "Automatic Modulation Identification Based on the Probability Density Function of Signal Phase," IEEE Transactions on Communications, vol. 60, No. 4, pp. 1033-1044, Apr. 2012.

Xu et al., "Software-Defined Radio Equipped With Rapid Modulation Recognition." IEEE Transactions on Vehicular Technology, vol. 59, No. 4, pp. 1659-1667, May 2010.

Karra et al., "Modulation Recognition Using Hierarchical Deep Neural Networks." in Proc. of IEEE International Symposium on Dynamic Spectrum Access Networks (DySPAN), Baltimore, MD, USA, Mar. 2017, pp. 1-3.

Wong et al., "Automatic Digital Modulation Recognition Using Spectral and Statistical Features With Multi-Layer Perceptrons." in Proceedings of the Sixth International Symposium on Signal Processing and its Applications (Cat. No. 01EX467), vol. 2, 2001, pp. 390-393.

Ghodeswar et al., "An SNR Estimation Based Adaptive Hierarchical Modulation Classification Method to Recognize M-ary QAM and M-ary PSK Signals." in Proc. of International Conference on Signal Processing, Communication and Networking (ICSCN), Chennai, India, Mar. 2015, pp. 1-6.

Chen et al., "Artificial Neural Networks-Based Machine Learning for Wireless Networks: A Tutorial." CoRR; arXiv.1710.029132 [cS.IT] Jun. 30, 2019, 33 pages.

O'Shea et al., "An Introduction to Deep Learning for the Physical Layer." IEEE Transactions on Cognitive Communications and Networking, vol. 3, No. 4, pp. 563-575, 2017.

O'Shea et al., "Over-the-Air Deep Learning Based Radio Signal Classification." IEEE Journal of Selected Topics in Signal Processing, vol. 12, No. 1, pp. 168-179, Feb. 2018.

Abadi et al., "Tensorflow: A system for large-scale machine learning." In OSDI, vol. 16, 2016, pp. 265-283.

Kulin et al., "End-to-End Learning From Spectrum Data: A Deep Learning Approach for Wireless Signal Identification in Spectrum Monitoring Applications," IEEE Access, vol. 6, pp. 18484-18501, 2018.

Bkassiny et al., "A Survey on Machine-Learning Techniques in Cognitive Radios," IEEE Communications Surveys & Tutorials, vol. 15, No. 3, pp. 1136-1159, Third Quarter 2013.

Jiang et al., "Machine Learning Paradigms for Next-Generation Wireless Networks," IEEE Wireless Communications, vol. 24, No. 2, pp. 98-105, Apr. 2017.

Wang et al., "Deep Learning for Wireless Physical Layer: Opportunities and Challenges," China Communications, vol. 14, No. 11, pp. 92-111, 2017.

West et al., "Deep architectures for modulation recognition." in Proc. of IEEE International Symposium on Dynamic Spectrum Access Networks (DySPAN), Baltimore, MD, USA, Mar. 2017; 7 pages; arXiv:1703.09197v1 [cs.LG] Mar. 27, 2017.

\* cited by examiner

REAL-TIME COGNITIVE WIRELESS NETWORKING THROUGH DEEP LEARNING IN TRANSMISSION AND RECEPTION COMMUNICATION PATHS

CROSS REFERENCE TO RELATED APPLICATIONS

This application claims priority under 35 U.S.C. § 119(e) of U.S. Provisional Application No. 62/740,669, filed on Oct. 3, 2018, entitled "Mechanism for Real-Time Spectrum-Driven Embedded Wireless Networking Through Deep Learning in the RF Loop," the disclosure of which is hereby incorporated by reference.

STATEMENT REGARDING FEDERALLY SPONSORED RESEARCH OR DEVELOPMENT

This invention was made with government support under Grant No. 598073 awarded by the Office of Naval Research. The government has certain rights in the invention.

BACKGROUND

The explosion of 5G networks and the Internet of Things is expected to result in an exceptionally crowded RF environment, where techniques such as spectrum sharing and dynamic spectrum access will become essential components of the wireless communication process. In this vision, wireless devices must be able to (i) learn to autonomously extract knowledge from the spectrum on the fly; and (ii) react in real time to the inferred spectrum knowledge by appropriately changing communication parameters, including frequency band, symbol modulation, and coding rate, among others. Traditional CPU-based machine learning suffers from high latency, and requires application-specific and computationally-intensive feature extraction/selection algorithms. Conversely, deep learning allows the analysis of massive amounts of unprocessed spectrum data without ad-hoc feature extraction. So far, deep learning has been used for offline wireless spectrum analysis only.

SUMMARY

Apparatuses and methods for real-time spectrum-driven embedded wireless networking through deep learning in transmission and reception communication paths are provided. Radio frequency, optical, or acoustic communication apparatus include a programmable logic system having a front-end configuration core, a learning core, and a learning actuation core. The learning core includes a deep learning neural network that receives and processes input in-phase/quadrature (I/Q) input samples through the neural network layers to extract RF, optical, or acoustic spectrum information. A processing system having a learning controller module controls operations of the learning core and the learning actuation core. The processing system and the programmable logic system are operable to configure one or more communication and networking parameters for transmission via the transceiver in response to extracted spectrum information.

Other aspects and embodiments include the following:

1 A radio frequency, optical, or acoustic communication apparatus comprising:
a radio frequency, optical, or acoustic transceiver;
a programmable logic system comprising a front-end configuration core, a learning core, and a learning actuation core, the front-end configuration core in communication with the transceiver, the learning core comprising a deep learning neural network including a plurality of neural network layers, the trained deep learning neural network operative to receive in-phase/quadrature (I/Q) input samples from the transceiver via the front-end configuration core and process the I/Q input samples through the neural network layers to extract RF, optical, or acoustic spectrum information; and
a processing system comprising at least a learning controller module, the learning controller module in communication with the programmable logic system to control operations of the learning core and the learning actuation core;
wherein the processing system and the programmable logic system are operable to configure one or more communication and networking parameters for transmission via the transceiver in response to extracted spectrum information.

2. The apparatus of item 1, wherein the processing system and the programmable logic system are further operable to reconfigure the deep learning neural network with new communication and networking parameters.

3. The apparatus of any of items 1-2, wherein the trained deep learning neural network has been trained with inputs of in-phase samples and quadrature samples to recognize the one or more communication and networking parameters.

4. The apparatus of any of items 1-3, wherein the deep learning neural network comprises a convolutional neural network, a multi-layer perceptron, or a feedforward network.

5. The apparatus of any of items 1-4, wherein the neural network layers include one or more of a convolution layer, a fully-connected layer, a rectified linear layer, and a pooling layer.

6. The apparatus of any of items 1-5, wherein the learning core further includes a block random access memory to store the I/Q input samples for processing at a controlled rate.

7. The apparatus of any of items 1-6, wherein the learning core is configured to carry out operation loops concurrently.

8. The apparatus of any of items 1-7, wherein the learning actuation core includes a block random access memory to receive inputs from a last neural network layer of the learning core.

9. The apparatus of any of items 1-8, wherein the learning actuation core is configured to receive I/Q input samples from or transmit I/Q samples to the front-end configuration core.

10. The apparatus of any of items 1-9, wherein the learning controller module is operative to initialize, start, stop, reset, configure, or reconfigure one or more of the learning core, the learning actuation core, and the front-end configuration core.

11. The apparatus of any of items 1-10, wherein the learning controller module is operative to configure each neural network layer with one or more of a weight, filter, bias, or activation function.

12. The apparatus of any of items 1-11, wherein the learning controller module is in communication with the programmable logic system to configure or reconfigure one or more circuits within the learning core, the learning actuation core, and the front-end configuration core via memory operations.

13. The apparatus of any of items 1-12, wherein the learning controller module is operative to initialize and/or reconfigure the front-end configuration core for transmission of a signal in response to the extracted spectrum information.

14. The apparatus of any of items 1-13, wherein:
the programmable logic system further comprises direct memory access storage in data transfer communication with the learning actuation core and a physical layer;
the physical layer communicates with the direct memory access in data bursts; and
incoming and outgoing I/Q samples are transmitted between the processing system and the programmable logic system via direct memory access.

15. The apparatus of any of items 1-14, wherein each of the learning core and the learning actuation core comprises one or more logic devices, the logic devices including one or more of a field programmable gate array (FPGA), application specific integrated circuit (ASIC), complex programmable logic device (CPLD), small-scale integrated circuit, programmable logic array, programmable logic device, masked-programmed gate array, arithmetic logic block, arithmetic logic operator, register, finite state machine, multiplexer, accumulator, comparator, counter, look-up table, gate, latch, flip-flop, input port, output port, carry in port, carry out port, parity generator, logic unit, and logic cell.

16. The apparatus of any of items 1-15, wherein the extracted spectrum information includes waveform features including one or more of average frequency, median frequency, kurtosis, skewness, cyclic moment, amplitude, frequency bandwidth, center frequency, energy level, energy rate, and power level, transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, signal to interference-plus-noise ratio, medium access control (MAC) protocols, routing protocols, transport layer protocols, application layer protocols.

17. The apparatus of any of items 1-16, wherein the configurable communication and networking parameters include one or more of transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, and signal to interference-plus-noise ratio, medium access control (MAC) protocols, routing protocols, transport layer protocols, application layer protocols.

18. The apparatus of any of items 1-17, wherein the processing system and the programmable logic system are configured as a system-on-chip on a substrate.

19. The apparatus of any of items 1-18, wherein the transceiver is a radio frequency transceiver.

20. A method for wireless communication, comprising:
receiving a transmission via a radio frequency, optical, or acoustic transceiver;
inputting in-phase/quadrature (I/Q) input samples from the transceiver to a programmable logic system comprising a front-end configuration core, a learning core, and a learning actuation core, the front-end configuration core in communication with the transceiver, and wherein the learning core comprises a deep learning neural network including a plurality of neural network layers;
processing the I/Q input samples through the neural network layers to extract spectrum and network information from the received transmission;
controlling one or more of the learning core, the learning actuation core, and the front-end configuration core by a processing system, the processing system comprising at least a learning controller module, the learning controller module in communication with the learning core and the learning actuation core to configure one or more communication and networking parameters for transmission via the transceiver;
transmitting a signal from the transceiver in response to the extracted spectrum and network information.

21. The method of item 20, further comprising reconfiguring, by the processing logic system and/or the processing system, the deep learning neural network with new communication and networking parameters.

22. The method of any of items 20-21, wherein the learning controller module is operative to initialize, start, stop, reset, configure, or reconfigure one or more of the learning core, the learning actuation core, and the front-end configuration core.

23. The method of any of items 20-22, wherein the learning controller module is operative to configure or reconfigure one or more circuits within the learning core, the learning actuation core, and the front-end configuration core via memory operations.

24. The method of any of items 20-23, wherein data transfer communications between the programmable logic system and the physical layer occur via direct memory access in data bursts.

25. The method of any of items 20-24, wherein the extracted spectrum information includes waveform features including one or more of average frequency, median frequency, kurtosis, skewness, cyclic moment, amplitude, frequency bandwidth, center frequency, energy level, energy rate, and power level, transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, signal to interference-plus-noise ratio, medium access control (MAC) protocols, routing protocols, transport layer protocols, application layer protocols.

26. The method of any of items 20-25, wherein the configurable communication and networking parameters include one or more of transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, and signal to interference-plus-noise ratio, medium access control (MAC) protocols, routing protocols, transport layer protocols, application layer protocols.

27. The method of any of items 20-26, wherein the received transmission is a radio frequency transmission.

28. The method of any of items 20-27, wherein the I/Q input samples are processed through the neural network layers to extract spectrum and networking information with a latency of 100 ms or less.

DESCRIPTION OF THE DRAWINGS

Reference is made to the following detailed description taken in conjunction with the accompanying drawings in which.

DETAILED DESCRIPTION

The present technology provides apparatuses and methods that integrate deep learning algorithms in a device's hardware and tightly intertwines it with the transmission and reception components to enable real-time spectrum-driven decision-making at the physical layer. The system enables radio frequency (RF), optical, and acoustic spectrum knowledge extraction from unprocessed I/Q samples by deep learning directly in the transmission/reception portion of the communication process. The apparatuses and methods are described herein in conjunction with an RF communication system. However, embodiments can be applied to optical and acoustic communication systems as well.

The system, sometimes referred to herein as RFLearn for convenience, provides (i) a complete hardware/software architecture where the CPU, transceiver and learning/actuation circuits are tightly connected for maximum performance; and (ii) a learning circuit design framework where the latency vs. hardware resource consumption trade-off can be explored. The performance of RFLearn has been evaluated on a custom software-defined radio built on a system-on-chip (SoC) ZYNQ-7000 device mounting AD9361 radio transceivers and VERT2450 antennas. The capabilities of RFLearn are demonstrated by applying it to solving fundamental problems of modulation and OFDM parameter recognition. Experimental results reveal that RFLearn decreases latency by 15-fold and reduces power consumption by about 17-fold with respect to a software-based solution, with a comparatively low hardware resource consumption. The system is fully reconfigurable through software and is capable of optimizing tradeoffs among latency, space, and energy. The system enables for the first time spectrum-driven real-time decision-making without CPU involvement. It offers greater efficiency and flexibility compared to software-based solutions by utilizing an effective and efficient hardware design. The system is applicable to a wide range of military and civilian applications, including: spectrum sensing for (i) detection of adversarial action (e.g., jamming) and (ii) system throughput; optimization through dynamic tuning of RF, optical, and acoustic communication and networking parameters; smart dynamic spectrum management for increased spectrum efficiency (e.g., through beam forming); and spectrum analysis for cellular network applications. The present technology can be fully implemented on chips, which provides reduced energy consumption and reduced costs.

A challenge in enabling technologies such as RF spectrum sharing through beamforming, dynamic spectrum access and anti jamming technologies is how to effectively and efficiently extract meaningful and actionable knowledge out of the tens of millions of in-phase/quadrature (I/Q) samples received every second by wireless devices. To give an example, to monitor a single 20 MHz WiFi channel, at least 40 million I/Q samples/s at Nyquist sampling rate must be processed. This generates a stream rate of about 2.56 Gbit/s, if samples are each stored in a 4-byte word. A second challenge is that the RF channel is significantly time-varying (i.e., in the order of milliseconds), which imposes strict timing constraints on the validity of the extracted RF knowledge. If (for example) the RF channel changes every 10 ms, a knowledge extraction algorithm must run with latency (much) less than 10 ms to both (i) offer an accurate RF prediction and (ii) drive an appropriate physical-layer response; for example, change in modulation/coding/beamforming vectors due to adverse channel conditions, local oscillator (LO) frequency due to spectrum reuse, and so on.

To address the knowledge extraction challenge, deep learning technology can be used for solving classification problems for which no well-defined mathematical model exists. Deep learning goes beyond traditional low-dimensional machine learning techniques by enabling the analysis of unprocessed I/Q samples without the need of application-specific and computationally expensive feature extraction and selection algorithms. Another core advantage is that deep learning architectures are application-insensitive, meaning that the same architecture can be retrained for different learning problems.

To transform the spectrum knowledge provided by deep learning into concrete decision-making at the physical layer, RF deep learning algorithms must execute in real-time (i.e., with static, known-a-priori latency). However, real-time constraints are hardly achievable in traditional CPU-based knowledge extraction algorithms, as general purpose CPUs can be interrupted at will by concurrent processes and thus introduce additional latency to the computation. Transferring data to the CPU from the radio interface through direct memory access (DMA) also introduces unacceptable latency for the RF domain. Moreover, processing I/Q rates in the order of Gbit/s would require CPUs to run continuously at maximum speed, and thus consume enormous amounts of energy. For these reasons, with systems, devices, and methods as described herein, RF deep learning algorithms are more closely integrated into the RF signal processing chain of the embedded device.

Traditionally, deep learning has been used in static contexts (e.g., image and language classification), where the model latency is usually not a concern. Another fundamental issue absent in traditional deep learning is the need to satisfy strict constraints on resource consumption. Indeed, models with high number of neurons/layers/parameters will necessarily require additional hardware and energy consumption, which are clearly scarce resources in embedded systems.

The present inventors are not aware of practical demonstrations of real-time deep learning in the RF loop for spectrum-driven wireless networking on embedded systems. The core issue in enabling real-time deep spectrum learning on embedded devices is the existing lack of an embedded software/hardware architectural design where I/Q samples are directly read from the RF front-end and analyzed in real time on the device's hardware without CPU involvement. To further complicate matters, this architecture must also be flexible enough to be reconfigurable through software based on the wireless application's need. Additionally, the strict constraints on latency and resource consumption (hardware and energy) imposed by the embedded RF domain necessarily require a design flow where learning performance is also met by energy/latency/hardware efficiency.

Accordingly, to fill these gaps, the present apparatuses and methods provide the following contributions. The apparatuses and methods provide learning in the transmission and reception communication paths, where spectrum-driven decisions are enabled through real-time deep learning algorithms implemented directly on the device hardware and operating on unprocessed I/Q samples. Embodiments are described herein in conjunction with an RF communication system, with a core termed "RFLearn" herein. RFLearn provides (i) a full-fledged hardware architecture for system-on-chip (SoC) devices binding together CPU, radio transceiver and learning/actuation circuits for maximum performance (described more particularly in Section II below); and (ii) a framework for RF deep learning circuit design that translates the learning model from a software-based implementation to an -compliant circuit using high-level synthesis (HLS) (described more particularly in Section IV below), where the constraints on latency, energy, learning, and hardware performance can be tuned based on the application.

RFLearn and its design cycle are evaluated on a custom software radio composed of a Zynq-7000 SoC mounting AD9361 radio transceivers and VERT2450 antennas (described in Section V below). As a practical case study, the fundamental problem of modulation and OFDM parameter recognition through deep learning is considered, and several classifier architectures are trained to address it (Section V-A). The latency and power consumption performance of RFLearn is experimentally compared with respect to the same model implemented in software (Section V-B). The design framework is applied to explore the tradeoff between HLS optimization and hardware consumption (Section V-C). Experimental results indicate that RFLearn outperforms the software-based system by decreasing latency and power consumption by respectively 17× and 15×, with a relatively low hardware resource consumption.

I. Background Notions on Deep Learning

Boldface upper and lower-case letters are used herein to denote matrices and column vectors, respectively. For a vector x, $x_i$ denotes the i-th element, $\|x\|$ indicates the Euclidean norm, $x^T$ its transpose, and x·y the inner product of x and y. For a matrix H, $H_{ij}$ indicates the (i,j)-th element of H. The notation $\mathcal{R}$ and $\mathcal{C}$ indicate the set of real and complex numbers, respectively.

Deep neural networks are mostly implemented as multilayer perceptrons (MLPs). More formally, an MLP with L layers is formally defined as a mapping $f(x_i; \theta): \mathcal{R}^i \rightarrow \mathcal{R}^o$ of an input vector $x_i \in \mathcal{R}^i$ to an output vector $x_j \in \mathcal{R}^o$. The mapping happens through L subsequent transformations, as follows:

$$r_j = f_j(r_{j-1}, \theta_j) \quad 0 \leq j \leq L \tag{1}$$

where $f_j(r_{j-1}, \theta_j)$ is the mapping carried out by the j-th layer. The vector $\theta = \{\theta_1, \ldots, \theta_L\}$ defines the whole set of parameters of the MLP.

A layer is said to be fully-connected (FCL) or dense if $f_j$ has the form $$f_j(r_{j-1}, \theta_j) = \sigma(W_j \cdot r_{j-1} + b_j) \tag{2}$$

where σ is an activation function, $W_j$ is the weight matrix and $b_j$ is the bias vector. This function introduces a non-linearity in the mapping processing, which allows for ever complex mappings as multiple layers are stacked on top of each other. Examples of activation functions are linear, i.e., $\sigma(x)_i = x_i$, rectified linear unit (RLU), i.e., $\sigma(x)_i = \max(0, x_i)$, and so on. Deep neural networks are generally trained using labeled training data, i.e., a set of input-output vector pairs $(x_{0,i}, x^*_{L,i})$, $1 \leq I \leq |S|$, where $x^*_{L,i}$ is the desired output of the neural network when $x_{0,i}$ is used as input.

Convolutional layers (CVLs) address the lack of scalability of FCLs by binding adjacent shifts of the same weights together similar to a filter sliding across an input vector. More formally, a CVL consists of a set of F filters $Q_f \in \mathbb{R}^{h \times w}$, $1 \leq f \leq F$, where F is also called the layer depth. Each filter generates a feature map $Y^f \in \mathbb{R}^{n' \times m'}$ from an input matrix $X \in \mathbb{R}^{n \times m}$ according to the following:

$$Y^f_{i,j} = \sum_{k=0}^{h-1} \sum_{\ell=0}^{w-1} Q^f_{h-k, w-\ell} \cdot X_{1+s(i-1)-k, 1+s(j-1)-\ell} \tag{3}$$

where s≥1 is an integer parameter called stride, n'=1+[n+h−2] and m'=1+[m+b−2]. The matrix X is assumed to be padded with zeros, i.e., $X_{i,j} = 0 \forall i \notin [1,n], j \notin [1,m]$. The output dimensions can be reduced by either increasing the stride s or by adding a pooling layer (POL). The POL computes a single value out of p×p regions of Y, usually maximum or average value. (For simplicity, (3) assumes input and filter dimension equal to 2. This formula can be generalized for tensors having dimension greater than 2.)

CNNs are commonly made up of only four layer types: convolutional (CVL), pooling (POL), fully-connected (FCL), and rectified-linear (RLL). The most common CNN architectures stack a number of CVL-RLU layers, (optionally) followed by POL layers, and repeat this pattern until the input has been merged spatially to a small size. At some point, it is common to transition to FCLs, with the last FCL holding the output (i.e., the classification output). In other words, the most common CNN architectures follow the pattern below:

$$IN \rightarrow \underbrace{[[CVL \rightarrow RLL]^N \rightarrow POL^{0 \ldots P}]}_{1 \ldots M} \rightarrow [FCL \rightarrow RLL]^{1 \ldots K} \rightarrow FCL$$

where N, M and K need to be chosen according to the specific classification problem. In computer vision applications, the most common parameters used are 0<N≤3, M≥0, 0≤K≤3. However, networks with very high number of N and K have been proposed to achieve better classification accuracy.

II. RFLearn Architecture

Figure 1:
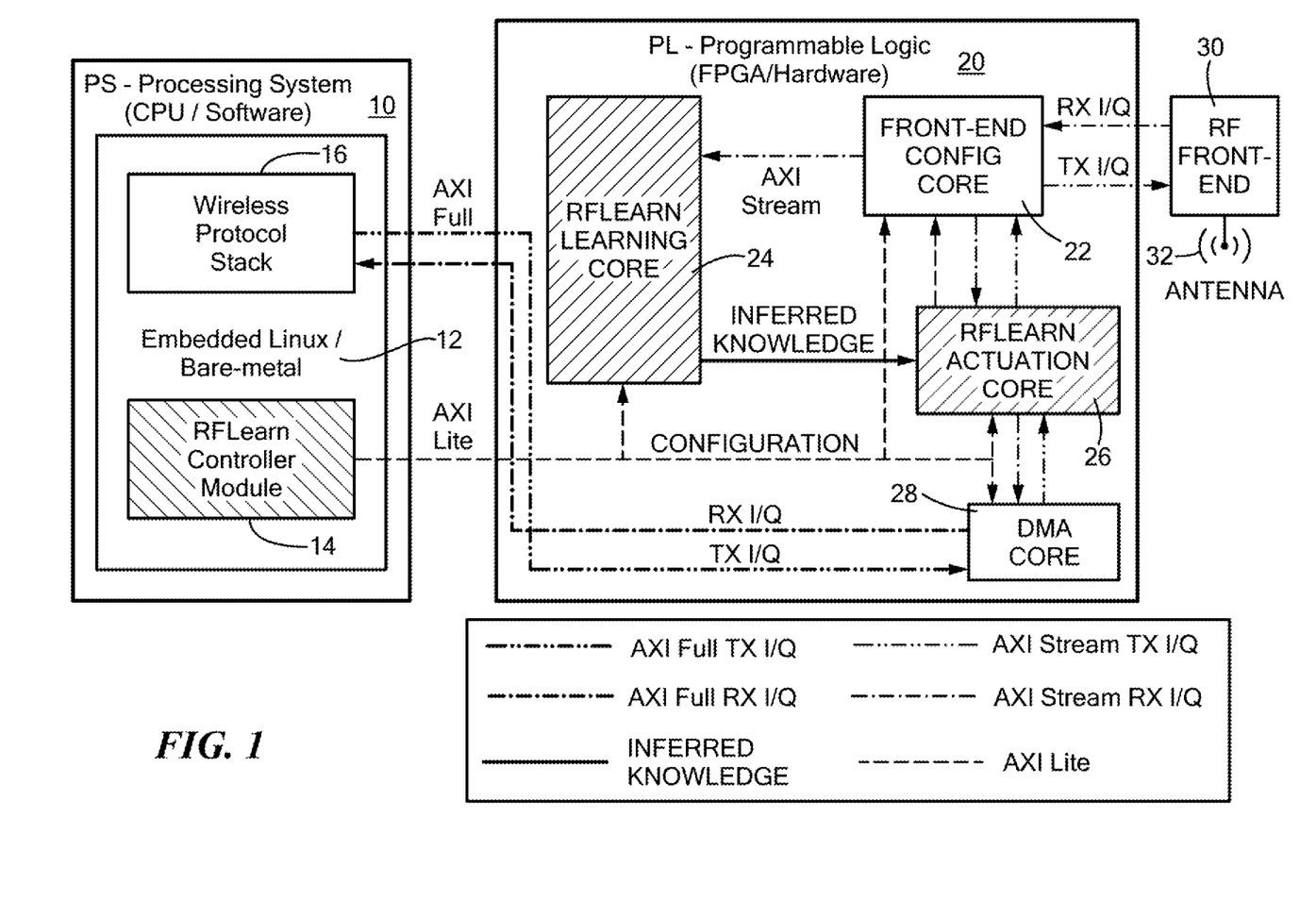
FIG. 1 is a schematic illustration of an RF deep learning hardware architecture.

FIG. 1 depicts an embodiment of a high-level overview of the architecture of the RFLearn system. Together with the RF front-end (hardware) and the wireless network stack (software), RFLearn complements a full-fledged reprogrammable software-defined radio architecture where learning is entirely done in the RF loop without CPU involvement. As noted above, embodiments of the RF architecture described herein can be applied to optical and acoustic systems as well, as will be apparent to those of skill in the art.

The system-on-chip (SoC) architecture is briefly introduced in Section III-A; each component of the RFLearn system is then described.

A. RFLearn System-On-Chip Computer Architecture

RFLearn's architectural components entirely reside in the processing system (PS) 10 and the programmable logic (PL) 20 portions of a system-on-chip (SoC), which is an integrated circuit (also known as "IC" or "chip") that integrates all the components of a computer, i.e., central processing unit (CPU), random access memory (RAM), input/output (I/O) ports and secondary storage (e.g., SD card)—all on a single substrate. SoCs are used due to their low power consumption and because they allow the design and implementation of customized hardware on the field-programmable gate array (FPGA) portion of the chip, also called programmable logic (PL) 20. Furthermore, SoCs bring great flexibility to RFLearn, as the PL can be reprogrammed at will according to the desired learning design. The PL portion of the SoC can be managed by the processing system (PS) 10, i.e., the CPU, RAM, and associated buses.

In some embodiments, RFLearn can use the Advanced eXtensible Interface (AXI) bus specification to exchange data (i) between functional blocks inside the PL; and (ii) between the PS and PL. In the embodiment illustrated, three AXI sub-specifications are used in RFLearn: AXI-Lite, AXI-Stream and AXI-Full. AXI-Lite is a lightweight, low-speed AXI protocol for register access, and it is used to configure the circuits inside the PL. AXI-Stream is used to transport data between circuits inside the PL. AXI-Stream is used since it provides (i) standard inter-block interfaces; and (ii) rate-insensitive design. Since all the AXI-Stream interfaces share the same bus clock, the HLS design tool can handle the handshake between deep learning layers and insert FIFOs for buffering incoming/outgoing samples. AXI-Full is used to enable burst-based data transfer from PL to PS (and vice versa). Along with AXI-Full, RFLearn uses direct memory access (DMA) to allow PL circuits to read/write data obtained through AXI-Stream to the RAM residing in the PS. The use of DMA is advantageous, since the CPU would be fully occupied for the entire duration of the read/write operation, and thus unavailable to perform other work. FIG. 1 depicts with continuous, dashed, and dot-dashed the AXI-Full, AXI-Lite and AXI-Stream interconnections.

With DMA, the CPU first initiates the transfer, then it does other operations while the transfer is in progress, and it finally receives an interrupt from the DMA controller when the operation is done. This feature is useful when the CPU cannot keep up with the rate of data transfer (which happens very often in the case of RF samples processing).

B. PS Modules

In the following, the RFLearn components residing in the PL and PS are referred to as cores (or circuits) and modules, respectively.

The main challenge addressed by the PS 10 is to provide modules that can drive and reconfigure the PL cores implementing the learning functionalities provided by RFLearn. The PS can run either on top of an operating system 12 (such as any embedded Linux distribution), or in "bare-metal" (also called "standalone") mode. In the latter, the only user application running on the CPU is the one specified at compile time. This mode is particularly useful to test the difference in latency between a learning system implemented in the PS (i.e., software) and in the PL (i.e., hardware).

Through the RFLearn Controller module 14, the PS has full domain over the activities of the cores residing in the PL. Specifically, the Controller is tasked to initialize/reconfigure through AXI-Lite (i) an RF front-end configuration core 22 with parameters such as sampling speed, center frequency, finite impulse response (FIR) filter taps, transmission (TX) and reception (RX) local oscillator (LO) frequency, TX/RX RF bandwidth, etc; and (ii) RFLearn learning core 24 and actuation core 26. The configuration values are stored in registers, so that both the PS and PL cores can access the configuration through memory operations. Moreover, the Controller 14 can, at any time, start/stop/check a PL core's operation through registers.

III. The RFLearn PL Cores

An objective of the PL cores 22, 24, 26 is to provide a learning-in-the-RF-loop system where each and every physical-layer operation, including the real-time learning, is done in hardware, with minimum (or absent) involvement of the PS 10.

The physical-layer data exchange (i.e., FQ samples) between the PS 10 and PL 20 is handled as follows. The samples flow to/from the PL from/to the PS through a DMA core 28, which reads/stores the samples from/into the RAM. The wireless protocol stack is tasked with programming the DMA according to its processing rate. However, the DMA can also be configured by the Controller 14, if no wireless protocol stack is present (i.e., the system only processes physical-layer data).

The PL receives/transmits I/Q samples through the RF Front-end configuration core 22, which main operations can be summarized as follows: (i) down/up converts I/Q samples from the carrier frequency (for example, 2.4 GHz) to baseband; (ii) applies FIR filtering, DC and I/Q imbalance corrections; and (iii) sends the processed I/Q samples to the RFLearn Learning core 24 through AXI-Stream. The 1/Q samples received by the RFLearn Actuation 26 core go through similar processing before being transmitted over the antenna 32. As mentioned before, the RF Front-end configuration core parameters are set through AXI-Lite, and can be changed both PS-side (i.e., by the RFLearn controller) and PL-side by the actuation core 26.

Figure 2:
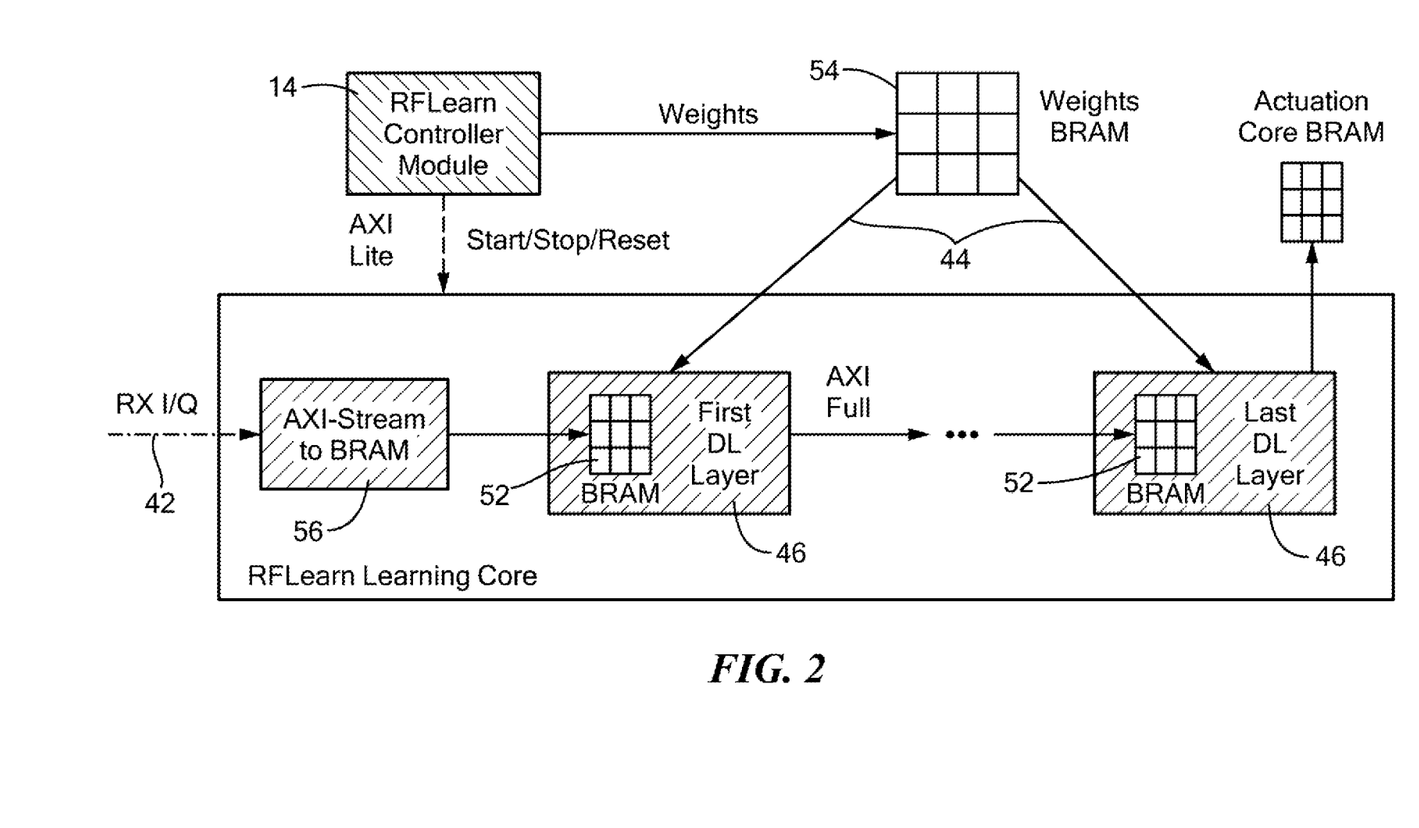
FIG. 2 is a schematic illustration of an RF deep learning core architecture.

The circuit that provides the deep learning capability to the system is the RFLearn Learning core 24, which architecture is detailed in FIG. 2. The inputs to this core are (i) a number of unprocessed I/Q samples 42 collected from the radio interface or front end 30; and (ii) the parameters 44 (i.e., weights, filters, and so on) belonging to each layer 46 (see Equations 1 and 3). Since the core may need to access these quantities in different time instants, both the I/Q samples 42 and the weights 44 are stored in block RAMs (BRAMs) 52, 54, a volatile memory that is implemented entirely in the PL portion of the SoC for maximum speed.

Thus, the core necessitates a FIFO 56 that converts the I/Q samples sent through AXI-Stream to a BRAM 52, so that the core can process the I/Q samples at its own pace. Transactions between the core and the BRAMs are done through AXI-Full.

Each layer 46 presents the following structure: (i) it receives its input from a BRAM 52; (ii) it processes the input, according to the type of the layer (i.e., convolutional, fully-connected, rectified linear unit, pooling); (iii) reads the weights 44 from the weights BRAM 54; (iii) writes the result on the BRAM of the following layer. This architecture presents a number of advantages: (a) modularity, since layers' computations are independent from each other; (b) scalability, since layers can be added on top of each other without changing the logic of the other layers; (c) reconfigurability, as weights can be changed by the Controller at any time without need to change the hardware structure. In Section IV, details are presented as to how this core is designed and optimized by using HLS.

The RFLearn Actuation core 26 has the task to process the I/Q samples that are received/sent from/to the RF transceiver at the RF front end 30. Furthermore, the actuation core may (if needed) change the configuration of the RF transceiver itself (e.g., change the FIR filters taps) and the modulation/demodulation logic (i.e., change the physical-layer de-modulation process, increase the coding level, and so on). This core's functionality is highly dependent on the given application, which determines the specific architecture for it, as would be understood by those skilled in the art.

IV. The RFLearn DL Core Design Framework

One challenge addressed by RFLearn is how to transition from a software-based deep learning (DL) implementation to a hardware-based implementation compatible with the RFLearn architecture discussed in Section II. Basic notions of high-level synthesis and the RFLearn DL core design are presented in Sections IV-A and IV-B, respectively.

A. High-level Synthesis

RFLearn uses high-level synthesis (HLS) for its core designs. HLS is an automated design process that interprets an algorithmic description of a desired behavior (e.g., C/C++) and creates a model written in hardware description language (HDL) that can be executed by the FPGA and implements the desired behavior.

Designing digital circuits using HLS has several advantages over traditional approaches. First, HLS programming models can implement almost any algorithm written in C/C++. This allows the developer to spend less time on the HDL code and focusing on the algorithmic portion of the design, and at the same time avoid bugs and increase efficiency, since HLS optimizes the circuit according to the system specifications.

The clock speed of commercially available FPGAs is several orders of magnitude slower than CPUs (i.e., up to 200-300 MHz in the best FPGAs). Thus, parallelizing the circuit's operations is advantageous. In traditional HDL, transforming the signal processing algorithms to fit FPGA's parallel architecture requires challenging programming efforts. On the other hand, an HLS toolchain can tell how many cycles are needed for a circuit to generate all the outputs for a given input size, given a target parallelization level. This helps RFLearn to make the best trade-off between hardware complexity and latency.

Loop Pipelining. In high-level languages (such as C/C++) the operations in a loop are executed sequentially and the next iteration of the loop can only begin when the last operation in the current loop iteration is complete. RFLearn uses loop pipelining to allow the operations in a loop to be implemented in a concurrent manner.

Figure 3:
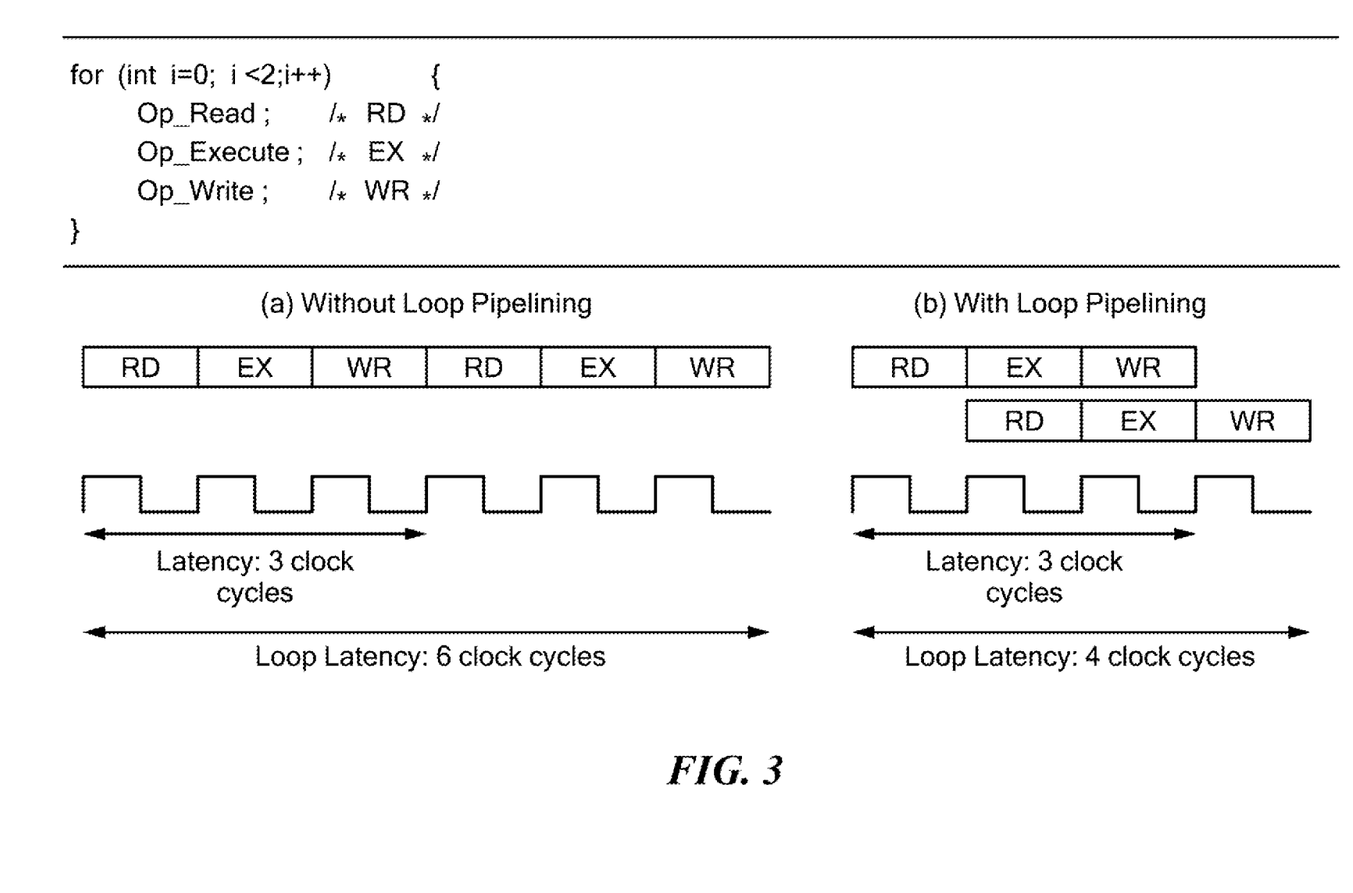
FIG. 3 is an illustration of loop pipelining.

FIG. 3 shows an example of loop pipelining, where a simple loop of three operations, i.e., read (RD), execute (EX), and write (WR), is executed twice. For simplicity, each operation is assumed to take one clock cycle to complete. Without loop pipelining, the loop would take six clock cycles to complete. Conversely, with loop pipelining, the next RD operation is executed concurrently to the EX operation in the first loop iteration. This brings the total loop latency to four clock cycles. If the loop length were to increase to 100, then the latency decrease would be even more evident: 300 versus 103 clock cycles, corresponding to a speedup of about 65%.

B. Design Steps

Figure 4:
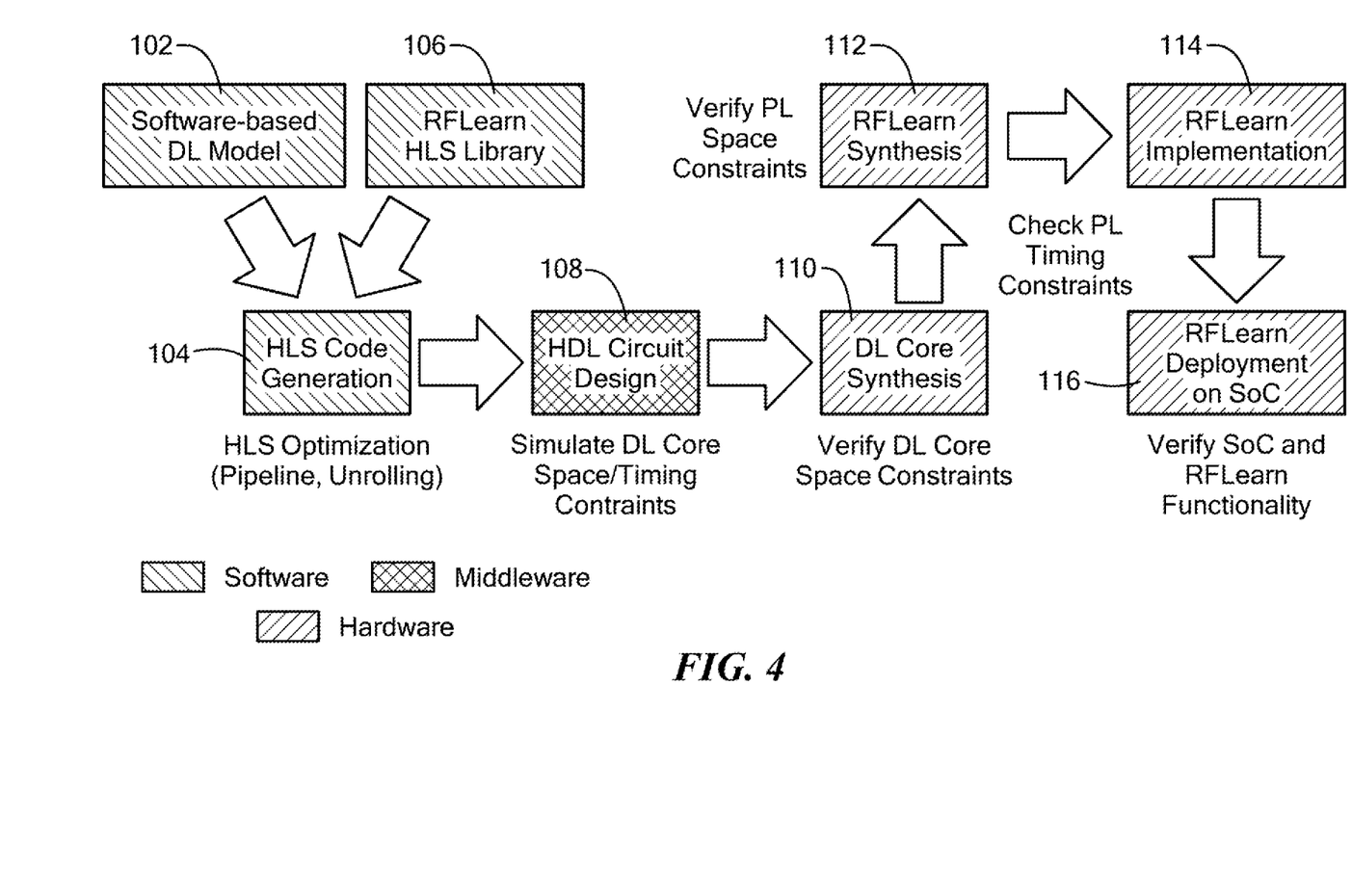
FIG. 4 is an illustration of an RF deep learning core design framework.

The framework presents several design and development steps, which are illustrated in FIG. 4. Steps that involve hardware, middleware (i.e., hardware description logic, or DHL), and software have been depicted with a blue, red, and green shade, respectively.

The first step 102 of the framework is to take an existing DL model and convert the model in HLS language, at step 104, so it can be optimized and later on synthesized in hardware. Another challenge is how to make the hardware implementation fully reconfigurable, i.e., the weights of the DL model may need to be changed by the Controller according to the specific training. To address these issues, RFLearn distinguishes between (i) the DL model architecture, which is the set of layers and hyper-parameters that compose the model itself, as in Equation (1); and (ii) the parameters of each layer, i.e., the neurons' and filters' weights (as discussed above).

To generate the HLS code describing the software-based DL model, a RFLearn HLS Library is used, step 106, which provides a set of HLS functions that parse the software-based DL model architecture and generates the HLS design corresponding to the architecture depicted in FIG. 2. The RFLearn HLS Library currently supports the generation of convolutional (CVL), fully-connected (FCL unit (RLU), and pooling (POL) layers, and operated on fixed-point arithmetic for better latency and hardware resource consumption. The HLS code is subsequently translated to HDL code at step 104 by an automated tool that takes into account optimization directives such as loop pipelining and loop unrolling. At this stage, the HDL describing the DL core can be simulated at step 108 to (i) calculate the amount of PL resources consumed by the circuit (i.e., flip-flops, BRAM blocks, etc); and (ii) estimate the circuit latency in terms of clock cycles.

After a compromise between space and latency as dictated by the application has been found, the DC core can be synthesized at step 110 and integrated with the other PL components of RFLearn at steps 112, and thus total space constraints can be verified. After implementation (i.e., placing/routing) at step 114, the PL timing constraints can be verified, and finally the whole RFLearn system can be deployed and its functionality tested at step 116.

In some embodiments, each of the learning core and the learning actuation core comprises one or more logic devices. The logic devices can be one or more of a field programmable gate array (FPGA), application specific integrated circuit (ASIC), complex programmable logic device (CPLD), small-scale integrated circuit, programmable logic array, programmable logic device, masked-programmed gate array, arithmetic logic block, arithmetic logic operator, register, finite state machine, multiplexer, accumulator, comparator, counter, look-up table, gate, latch, flip-flop, input port, output port, carry in port, carry out port, parity generator, logic unit, and logic cell.

In some embodiments, the extracted spectrum information includes waveform features including one or more of average frequency, median frequency, kurtosis, skewness, cyclic moment, amplitude, frequency bandwidth, center frequency, energy level, energy rate, and power level, transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, signal to interference-plus-noise ratio, medium access control (MAC) protocols, routing protocols, transport layer protocols, application layer protocols.

In some embodiments, the configurable communication and networking parameters include one or more of transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, and signal to interference-plus-noise ratio, medium access control (MAC) protocols, routing protocols, transport layer protocols, application layer protocols.

The apparatuses and methods described herein can be implemented as part of computer systems or other devices that receive and transmit communications. Such a computing system can be implemented as or can include a computer device that includes a combination of hardware, software, and firmware that allows the computing device to run an applications layer or otherwise perform various processing tasks. Computing devices can include without limitation personal computers, work stations, servers, laptop computers, tablet computers, mobile devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processor and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), block random access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link.

The computing device can include a browser and a display that allow a user to browse and view pages or other content served by a web server over the communications link. A web server, sever, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a services (DaaS), backend as a service (BaaS), test environment as a service (TEaaS), API as a service (APIaaS), and integration platform as a service (IPaaS).

V. EXAMPLES: MODULATION AND OFDM PARAMETERS RECOGNITION

To evaluate the performance of RFLearn on two real-world RF deep learning (DL) problems, the problem of physical-layer modulation recognition (in short, ModRec) and OFDM parameter recognition (in short, OFDMRec) have been considered.

Figure 5:
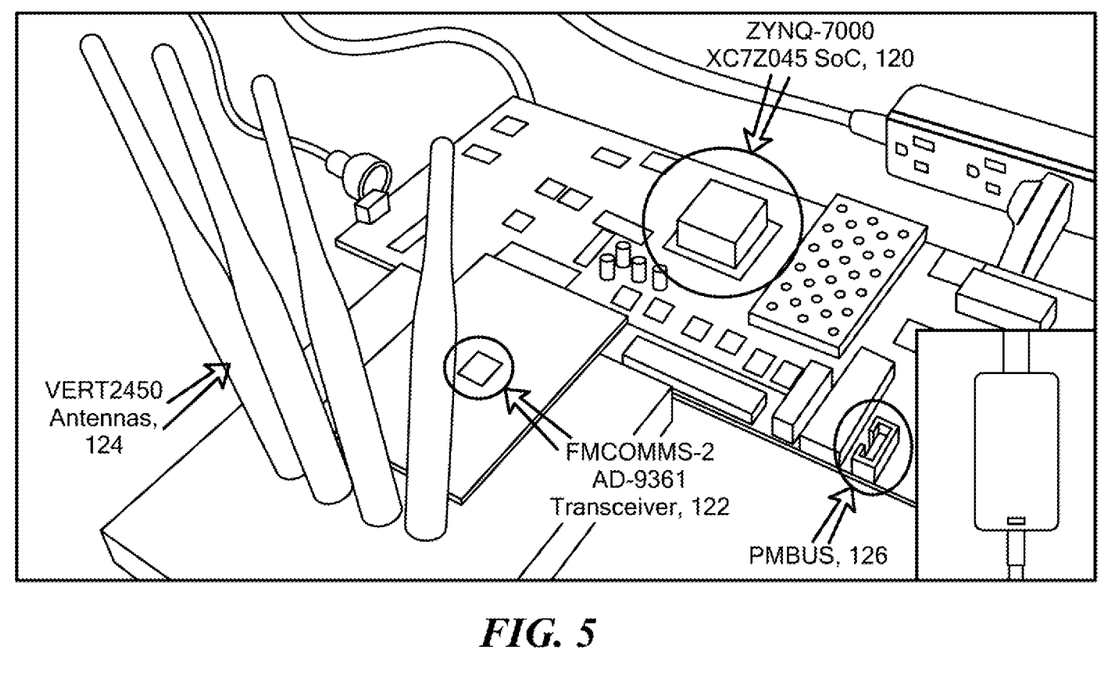
FIG. 5 is an illustration of an RF deep learning experimental testbed.

For the experimental evaluation, a testbed was implemented as shown in FIG. 5 and composed of the following pieces of equipment: (i) a Xilinx Zynq-7000 XC7Z045-2FFG900C system-on-chip (SoC) 120 with two ARM Cortex-A9 MPCore CPUs as processing system (PS) and a Kintex-7 FPGA as programmable logic (PL), running on top of a Xilinx ZC706 evaluation board; (ii) an Analog Devices (AD)-9361 RF transceiver 122 running on top of an AD-FMCOMMS2 evaluation board; (iii) four VERT2450 antennas 124, two for each TX/RX channel of the AD-9361; (iv) a Texas Instruments (TI) USB-TO-GPIO Interface Adapter 126 to compute real-time power consumption of our board through the PMBUS standard. This equipment was selected since it provides significant flexibility in both the RF, PL and PS components, and thus allows a full evaluation of the trade-offs during system design.

Example 1. Deep Learning Model Training

As explained in Section IV, the first step in the RFLearn system design process is to obtain a trained convolutional neural network (CNN) architecture. For this reason, a series of experiments were performed with the testbed to obtain two datasets: (i) I/Q samples corresponding to 5 different modulation schemes (i.e., BPSK, QPSK, 8PSK, 16QAM, DQPSK); and (ii) I/Q samples of an OFDM transmission with three FFT size parameters (i.e., 64, 128, 256). To collect the samples, another software-defined radio (i.e., a Xilinx Zedboard mounting an AD-FMCOMMS2 as RF transceiver) acting as transmitter was used, while the testbed was used to receive the samples.

If not stated otherwise, the model was trained on inputs of size 32×32×2 where $\ell$ =32, i.e., 32 rows of 32 I samples plus 32 rows of 32 Q samples. The model was trained using Tensorflow for 20 epochs, using 150,000 samples per class. An additional dataset of 200,000 inputs generated from the collected experimental data was used as a test set. The filter and pooling length was set to 3, and the filter stride to 1.

To address ModRec, an architecture with M=2 and K=2, fixing N=1 was considered. Table I shows the related classification accuracy. It can be observed that with a relatively small DL architecture with low number of kernels/neurons (as compared to modern computer vision models) an accuracy of at least 90% over 5 classes was achieved. This is also thanks to the shift-invariance property of CNNs. It can also be concluded that the number of kernels and the number of neurons definitely impact the model's accuracy; by doubling the number of kernels and increasing the number of neurons from 6-3 to 16-8, the accuracy can be increased by about 14%.

To further investigate the impact that the different kinds of modulations have on the model's accuracy, the same DL architecture was trained on two sets of 4 modulation classes, namely SET-1={BPSK, QPSK, 16QAM, 8PSK} and SET-2={BPSK, QPSK, 16QAM, DQPSK}. Since in SET-2 two very similar modulations (i.e., QPSK and DQPSK) were considered, worse classification accuracy was expected with respect to S1 with the same DL architecture.

TABLE I

Test Accuracy Results, Modulation Dataset

| Number of Kernels in CVL Layers | Number of Neurons in FCL Layers | Test Set Accuracy |
| --- | --- | --- |
| 24-12 | 16-8 | 0.90122 |
|  | 6-3 | 0.84615 |
| 18-9 | 16-8 | 0.86677 |
|  | 6-3 | 0.82788 |

Table II shows the model's accuracy for both SET-1 and SET-2. As expected, Table II indicates that the model's accuracy is higher for SET-1 than for SET-2 (9% on average), since the classes are more distinct in the former case. Therefore, not only does the number of modulation classes impact the model's accuracy, but also the type of modulation classes considered.

TABLE II

Test Accuracy Results, SET-1/Set-2 Datasets

| Number of Kernels in CVL Layers | Number of Neurons in FCL Layers | Test Set Accuracy SET-1/SET-2 |
| --- | --- | --- |
| 24-12 | 16-8 | 0.95344/0.87375 |
|  | 6-3 | 0.94079/0.83505 |
| 18-9 | 16-8 | 0.94580/0.86328 |
|  | 6-3 | 0.92159/0.85345 |

TABLE III

Test Accuracy Results, OFDM Parameter Dataset

| Input Size | Kernels | Neurons | Test Set Accuracy |
| --- | --- | --- | --- |
| 48 × 48 × 2 | 24-12 | 24-12 | 0.8363 |
|  |  | 12-6 | 0.7970 |
| 32 × 32 × 2 | 24-12 | 24-12 | 0.7470 |
|  |  | 12-5 | 0.7351 |

To investigate OFDMRec, an architecture was trained with a greater number of kernels/neurons and also increased input size. Table III reports the classification results as a function of parameters and input size. As can be seen, by increasing the input size to 48×48, the accuracy increased by 10%, which indicates that an increase in model complexity increases classification accuracy accordingly.

Example 2. RFLearn vs. Software Latency/Space/Power Comparison

The experimental testbed RFLearn latency performance was compared to a software (SW) implementation. To this end, the RFLearn HLS Library was used to generate an equivalent model in C++ code to be executed in the PS portion of the testbed to test the difference in latency. To measure latency down to the clock cycle level, an additional AX1 Timer core was used to count the number of clock cycles needed to produce the classification result in both hardware and software. To allow a fair comparison between the SW and the HW version, the testbed was run in "baremetal" mode (i.e., without operating system).

In the following experiments, the PL clock frequency was set to 100 MHz (equivalent to 10 ns clock period), with the exception of the RF front-end core that was clocked at 200 MHz. Note that the frequency of each PL clock can be changed at any time through register configuration, without the need to implement each core in the PL from scratch. The CPU clock speed is instead 667 MHz as per vendor datasheet.

TABLE IV

RFLearn/SW Comparision, M = 1, K = 1

| Kern | Neur | SW | RFLearn | BRAM | LUT |
|---|---|---|---|---|---|
| 24 | 16 | 235.8 ms | 13.7 ms | 166 (15%) | 28247 (12%) |
|    | 8  | 220.1 ms | 13.2 ms | 166 (15%) | 28227 (12%) |
| 12 | 16 | 120.7 ms | 6.9 ms  | 86 (7%)   | 20427 (9%)  |
|    | 8  | 111.9 ms | 6.6 ms  | 86 (7%)   | 20406 (9%)  |
| 6  | 16 | 61.1 ms  | 3.4 ms  | 46 (4%)   | 16413 (7%)  |
|    | 8  | 56.5 ms  | 3.2 ms  | 46 (4%)   | 16399 (7%)  |

Tables IV and V report the RFLearn vs. SW comparison in terms of latency (expressed in milliseconds), and the related HW resource consumption (with related percentage) in terms of number of BRAM and look-up tables (LUT), for the M=1, K=1 and M=2, K=2 architectures, respectively. For the sake of space, the number of flip-flops (FF) consumed is not reported, since it is about 1% of the total resources in all the considered cases. The number of DSP48E1 slices consumed was 21 and 39 out of 900, respectively. (A DSP48E1 is a complex circuit providing a multiplier, an accumulator, a pre-adder, and two arithmetic logic units, among other features.) For each SW latency measurement, the average over 100 repetitions is reported. Standard deviations are not reported, since they were below 1% of the average.

TABLE V

RFLearn/SW Comparison, M = 2, K = 2

| Kern | Neur | SW | RFLearn | BRAM | LUT |
|---|---|---|---|---|---|
| 24-12 | 16-8 | 1376.4 ms | 75.9 ms | 220 (20%) | 23673 (10%) |
|       | 6-3  | 1334.1 ms | 75.6 ms | 220 (20%) | 23677 (10%) |
| 189   | 16-8 | 767.8 ms  | 45.2 ms | 220 (20%) | 21738 (9%)  |
|       | 6-3  | 795.2 ms  | 44.9 ms | 220 (20%) | 21689 (9%)  |
| 12-6  | 16-8 | 389.17 ms | 22.3 ms | 116 (10%) | 19636 (8%)  |
|       | 6-3  | 380.86 ms | 22.1 ms | 116 (10%) | 19663 (8%)  |

The first result to note is the significant difference in latency performance between RFLearn and SW. On the average, when M=1, K=1, RFLearn improves the latency by about 17×, i.e., an order of magnitude with respect to SW, with a tolerable BRAM and LUT occupation of 15% and 12% in the worst case, respectively. The latency improvement brought by RFLearn is confirmed also in the M=2, K=2 experiments, where the latency improvement with respect to SW continues to be about 17× on the average, at the cost of an increase in HW resource consumption (20% vs 15% BRAM in the worst case). Surprisingly enough, in some cases RFLearn consumes less LUT resources when M=2, K=2. This can be explained by the fact that in these cases the Flatten layer (used to transform a tensor input to a linear input to the FCL) has less inputs than with M=1, K=1, which causes less LUT consumption.

TABLE VI

RFLearn/SW/Idle Power Comparison

| Exp | 1.0 V | 1.8 V | 1.5 V | 2.5 V | 3.3 V | Total |
|---|---|---|---|---|---|---|
| Idle     | 0.16 A | 0.06 A | 0.02 A | 0.11 A | 0.06 A | 0.771 W |
| Software | 0.28 A | 0.12 A | 0.03 A | 0.11 A | 0.06 A | 1.014 W |
| RFLearn  | 0.37 A | 0.13 A | 0.03 A | 0.13 A | 0.06 A | 1.172 W |

Table VI summarizes the current absorption (in Amperes) as measured at the different power rails of the ZC706 board. To obtain these results, the 24-12-16-8 RFlearn model (the most complex and thus, the worst case for power consumption) was selected and the results were averaged over 1000 measurements. As expected, RFLearn experienced higher power consumption than the software-based implementation. However, the lower latency (75.9 ms vs 1376.4 ms) experienced by RFLearn allowed outstanding energy savings with respect to software. For example, in the considered case, the RFLearn energy consumption is 87.9 mJ, which is about 15× lower than software (1395.6 mJ).

Example 3. HLS Latency Optimization

In in Section IV it was mentioned that RFLearn is capable to decrease drastically the latency of the DL learning core through HLS optimization, at the cost of an increase in HW consumption. To prove this point, Table VII shows the decrease in latency for different DL architectures upon HLS optimization, and the related amount of DSP48E1 slices consumed by the circuit. The increase in BRAM, LUT and FF is not reported, since it was less than 1% in all cases.

TABLE VII

RFLearn Optimization, Latency vs. HW Space

| Kern | Neur | Latency | DSP48E1 |
|---|---|---|---|
| 24    | 16   | 13.7 ms → 8.2 ms (−67%)   | 39 → 75 (+92%) |
| 3     | 16   | 1.6 ms → 1.04 ms (−54%)   |                |
| 24-12 | 16-8 | 75.9 ms → 37.9 ms (−100%) | 21 → 39 (+85%) |
| 12-6  | 16-8 | 22.3 ms → 11.5 ms (−93%)  |                |

The optimization made through HLS was to pipeline the loops corresponding to the computation of one filter output, so that the summing operations in Equation 3 can be executed in parallel. Table VII shows that by pipelining the convolution loops, a significant reduction in latency can be achieved. It can be pointed out that the decrease in latency becomes ever more evident as (i) the number of convolutional layers (CVLs) and (ii) the number of kernels in one layer increase. Indeed, there is a 67% vs. 100% latency reduction when going from one to two CVLs, and a 67% vs. 54% by going from 24 to 3 kernels. This decrease in latency corresponds to an increase in DSP48E1 circuitry, which is almost double in the first architecture. Although the SoC considered in this paper supports up to 900 DSP48Els, other architectures might have less DSP circuitry. Therefore, the trade-off between space and latency must always be considered before deploying the architecture on the SoC.

Figure 6:
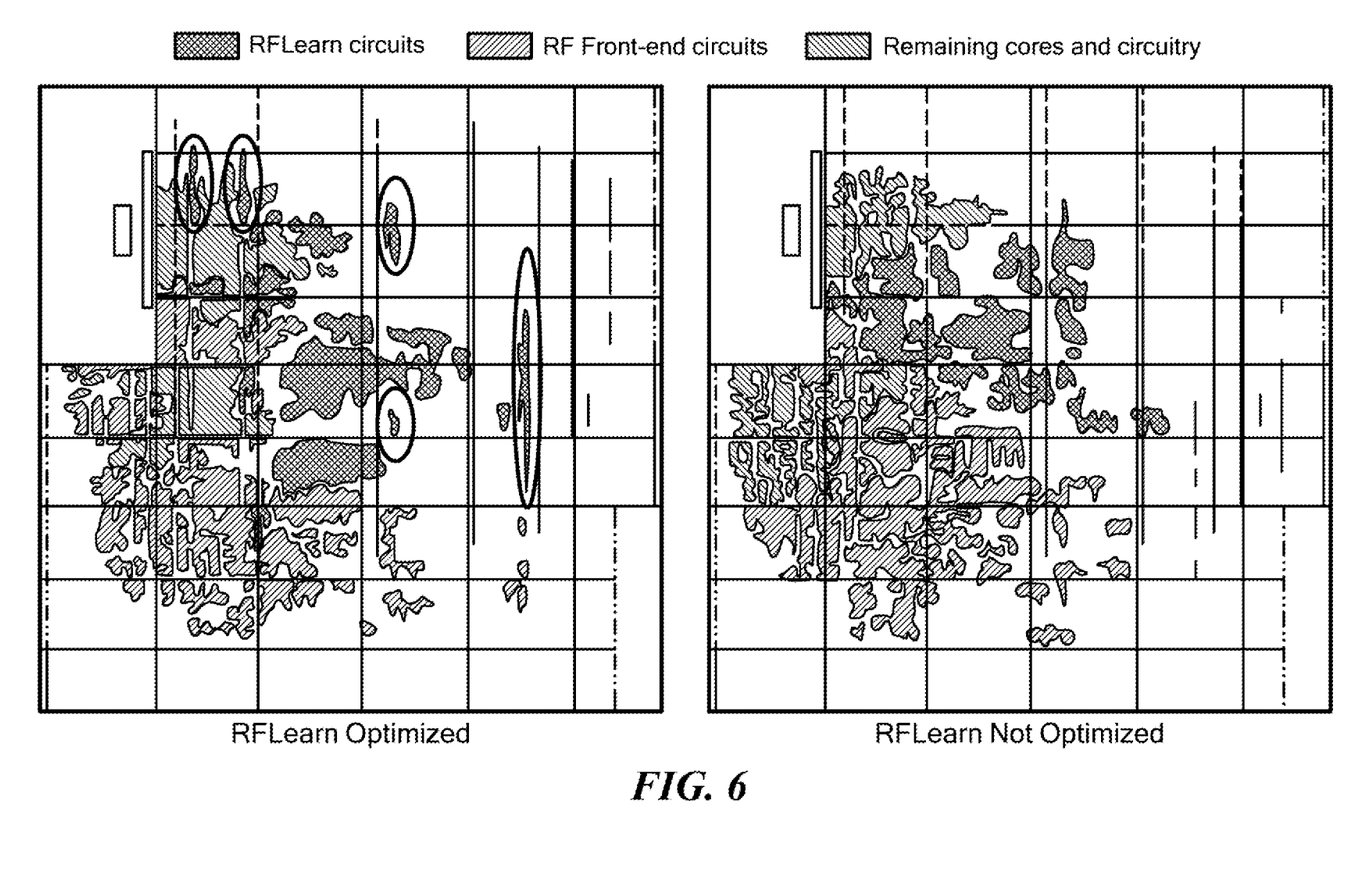
FIG. 6 is an illustration of an RF deep learning hardware consumption and high level synthesis optimization.

FIG. 6 provides a visual perspective on the amount of resource consumed by the RFLearn architecture with/without HLS optimization, also as compared to other circuitry residing in the FPGA. FIG. 6 shows the complete implementation on FPGA of the architecture discussed in Section III, assuming an M=2, K=2 DL core, with/without the optimization discussed in Table VII. In FIG. 6, the circuits belonging to RFLearn, the RF Front-end, and remaining cores and circuitry (i.e., DMAs, AXI interconnections, etc) are indicated by different shadings. The additional DSP48E1 slices added as part of the HIS optimization procedures are circled. FIG. 6 indicates that (i) the amount of resources consumed by RFLearn are approximately the same as the RF Front-end circuitry. Moreover, the impact on the overall FPGA resource consumption is tolerable, as all the circuitry together occupies approximately 35% of the overall FPGA resources; and (ii) as expected, the highest amount of resources consumed by the RFLearn circuitry is BRAM and DSP48E1, in both cases.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments and aspects described herein can be combined in a variety of ways. For example, a feature described in conjunction with one embodiment or aspect may be included in another embodiment or aspect even if not explicitly described in conjunction with that embodiment or aspect.

To the extent that the appended claims have been drafted without multiple dependencies, this has been done only to accommodate formal requirements in jurisdictions that do not allow such multiple dependencies. It should be noted that all possible combinations of features that would be implied by rendering the claims multiply dependent are explicitly envisaged and should be considered part of the invention.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A radio frequency (RF), optical, or acoustic communication apparatus comprising:
    a radio frequency, optical, or acoustic transceiver;
    a programmable logic system comprising a front-end configuration core, a learning core, and a learning actuation core, the front-end configuration core in communication with the transceiver, the learning core comprising a deep learning neural network including a plurality of neural network layers, the deep learning neural network operative to receive unprocessed in-phase/quadrature (I/Q) input samples from the transceiver via the front-end configuration core and process the I/Q input samples through the neural network layers to extract RF, optical, or acoustic spectrum information; and
    a processing system comprising at least a learning controller module, the learning controller module in communication with the programmable logic system and operative to initialize, start, stop, reset, configure, or reconfigure one or more of the learning core, the learning actuation core, and the front-end configuration core and/or operative to configure each neural network layer with one or more of a weight, filter, bias, or activation function;
    wherein the processing system and the programmable logic system are operable to configure one or more communication and networking parameters for transmission via the transceiver in response to extracted spectrum information,
    wherein the programmable logic system is operative to receive the unprocessed I/Q input samples from the transceiver via the front-end configuration core and process the I/Q input samples through the neural network layers to extract RF, optical, or acoustic spectrum information without involvement of the processing system.

2. The apparatus of claim 1, wherein the processing system and the programmable logic system are further operable to reconfigure the deep learning neural network with new communication and networking parameters.

3. The apparatus of claim 1, wherein the deep learning neural network has been trained with inputs of in-phase samples and quadrature samples to recognize the one or more communication and networking parameters.

4. The apparatus of claim 1, wherein the deep learning neural network comprises a convolutional neural network, a multi-layer perceptron, or a feedforward network.

5. The apparatus of claim 1, wherein the neural network layers include one or more of a convolution layer, a fully-connected layer, a rectified linear layer, and a pooling layer.

6. The apparatus of claim 1, wherein the learning core further includes a block random access memory to store the I/Q input samples for processing at a controlled rate.

7. The apparatus of claim 1, wherein the learning core is configured to carry out operation loops concurrently.

8. The apparatus of claim 1, wherein the learning actuation core includes a block random access memory to receive inputs from a last neural network layer of the learning core.

9. The apparatus of claim 1, wherein the learning actuation core is configured to receive I/Q input samples from or transmit I/Q samples to the front-end configuration core.

10. The apparatus of claim 1, wherein the learning controller module is operative to initialize and/or reconfigure the front-end configuration core for transmission of a signal in response to the extracted spectrum information.

11. The apparatus of claim 1, wherein:
    the programmable logic system further comprises direct memory access storage in data transfer communication with the learning actuation core and a physical layer;
    the physical layer communicates with the direct memory access in data bursts; and
    incoming and outgoing I/Q samples are transmitted between the processing system and the programmable logic system via direct memory access.

12. The apparatus of claim 1, wherein each of the learning core and the learning actuation core comprises one or more logic devices, the logic devices including one or more of a field programmable gate array (FPGA), application specific integrated circuit (ASIC), complex programmable logic device (CPLD), small-scale integrated circuit, programmable logic array, programmable logic device, masked-programmed gate array, arithmetic logic block, arithmetic logic operator, register, finite state machine, multiplexer, accumulator, comparator, counter, look-up table, gate, latch, flip-flop, input port, output port, carry in port, carry out port, parity generator, logic unit, and logic cell.

13. The apparatus of claim 1, wherein the extracted spectrum information includes waveform features including one or more of average frequency, median frequency, kurtosis, skewness, cyclic moment, amplitude, frequency bandwidth, center frequency, energy level, energy rate, and power level, transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, signal to interference-plus-noise ratio, medium access control (MAC) protocols, routing protocols, transport layer protocols, application layer protocols.

14. The apparatus of claim 1, wherein the configurable communication and networking parameters include one or more of transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, and signal to interference-plus-noise ratio, medium access control (MAC) protocols, routing protocols, transport layer protocols, application layer protocols.

15. A method for wireless communication, comprising:
receiving a transmission via a radio frequency, optical, or acoustic transceiver;
inputting unprocessed in-phase/quadrature (I/O) input samples from the transceiver to a programmable logic system comprising a front-end configuration core, a learning core, and a learning actuation core, the front-end configuration core in communication with the transceiver, and wherein the learning core comprises a deep learning neural network including a plurality of neural network layers;
processing the I/O input samples through the neural network layers to extract spectrum and network information from the received transmission;
initializing, starting, stopping, resetting, configuring, or reconfiguring, by a processing system, one or more of the learning core, the learning actuation core, and the front-end configuration core and/or configuring, by the processing system, each neural network layer with one or more of a weight, filter, bias, or activation function;
configuring, by a learning controller module in communication with the learning core and the learning actuation core, one or more communication and networking parameters for transmission via the transceiver;
transmitting a signal from the transceiver in response to the extracted spectrum and network information; and
wherein the programmable logic system is operative to receive the unprocessed I/O input samples from the transceiver via the front-end configuration core and process the I/O input samples through the neural network layers to extract the spectrum and network information without involvement of the processing system.

16. The method of claim 15, further comprising reconfiguring, by the programmable logic system and/or the processing system, the deep learning neural network with new communication and networking parameters.

17. The method of claim 15, wherein data transfer communications between the programmable logic system and the physical layer occur via direct memory access in data bursts.

18. The method of claim 15, wherein the extracted spectrum information includes waveform features including one or more of average frequency, median frequency, kurtosis, skewness, cyclic moment, amplitude, frequency bandwidth, center frequency, energy level, energy rate, and power level, transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, signal to interference-plus-noise ratio, medium access control (MAC) protocols, routing protocols, transport layer protocols, application layer protocols.

19. The method of claim 15, wherein the configurable communication and networking parameters include one or more of transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, and signal to interference-plus-noise ratio, medium access control (MAC) protocols, routing protocols, transport layer protocols, application layer protocols.

20. The method of claim 15, wherein the I/Q input samples are processed through the neural network layers to extract spectrum and networking information with a latency of 100 ms or less.

* * * * *